United States Patent [19]
Cannon et al.

[11] Patent Number: 5,751,590
[45] Date of Patent: May 12, 1998

[54] SYSTEM FOR PRINTING SOCIAL EXPRESSION CARDS

[75] Inventors: Thomas G. Cannon, Loveland; Daniel L. DeHart, Greeley; Eric M. Krug, Loveland, all of Colo.

[73] Assignee: Onkor, Ltd., Loveland, Colo.

[21] Appl. No.: 791,197

[22] Filed: Jan. 31, 1997

Related U.S. Application Data

[63] Continuation of Ser. No. 949,715, Sep. 23, 1992, Pat. No. 5,600,563.

[51] Int. Cl.$^6$ .................................................. G06F 17/00
[52] U.S. Cl. ............................ 364/479.03; 364/479.05
[58] Field of Search .................... 364/479.03, 479.05; 235/379, 381, 382, 383; 902/18, 30, 21–23, 41

[56] References Cited

U.S. PATENT DOCUMENTS

| | | | |
|---|---|---|---|
| 3,688,276 | 8/1972 | Quinn | 340/172.5 |
| 3,757,037 | 9/1973 | Bialek . | |
| 3,892,427 | 7/1975 | Kraynak et al. | 281/15 R |
| 3,949,375 | 4/1976 | Ciario . | |
| 3,982,744 | 9/1976 | Kraynak et al. | 270/12 |
| 4,436,776 | 3/1984 | Wojcik | 428/14 |
| 4,650,977 | 3/1987 | Couch | 235/379 |
| 4,654,799 | 3/1987 | Ogaki et al. | 364/479 |

(List continued on next page.)

FOREIGN PATENT DOCUMENTS 0010399   4/1980   European Pat. Off. .

OTHER PUBLICATIONS

"High Tech Bard of Greeting Cards" *Nation's Business*, Feb. 1985, 1 page.
"The Social Secretary" Brochure, 4 pages, (date unknown).
"The Card/O/Mat" brochure, 6 pages (date unknown).
"7–Eleven to Sell Do–it–Yourself Tickets", Insight, Jan. 16, 1987, p. 42.
"In–Store Computer Designs Home Projects", Design News, Oct. 23, 1989, p. 38.
"Now There's A Robot", Design News, Mar. 26, 1990, pp. 78–81.
Hohman, Edward J., "How Computerized Cards Make This Shop 'Truly' A Treat", Greetings Magazine, vol. 55, No. 3, Jan., 1987, pp. 3, 12, 13, and 24.
Balsam, David and Martin Kahn, "The Print Shop Reference Manual", Copyright 1986, 1989 Broderbund Software, Inc. pp. 1–51.
"Lets Make Calendars and Stationery", User's Manual, Kyocera Unison, Inc. (1986).
Solomon, "Got Something to Announce, Promote, Sell?", Family Computing, Jul. 1987, pp. 43–45.
"Print a Little Message", Inscribe, Inc. (date unknown).
"ITEX p. II" brochure, Itex Corporation (date unknown).
"CreateaCard" system introduced by Custom Expressions, Inc., May, 1990.
Card Shop Brochure, Artsci, 1986, 1 page.

*Primary Examiner*—James P. Trammell
*Attorney, Agent, or Firm*—Dorr, Carson, Sloan & Birney, P.C.

[57] ABSTRACT

A system for printing social expression cards includes both a database preparation system and a plurality of remote card printing systems. The database preparation system uses a scanner to input images from a plurality of cards, or a computer software program to create a plurality of images for use in card designs. A high resolution print image and a lower resolution display image are created from each of these images. A card description database defines the layout of each card in terms of its component images and their locations on the card. The database preparation system can also build a menu database defining a structure of menu screens to query the user to select a desired category of cards. A list of card names is linked to each category in the menu database. These databases and image files are then copied onto removable data storage media for distribution to each of the card printing systems.

18 Claims, 10 Drawing Sheets

U.S. PATENT DOCUMENTS

| | | | |
|---|---|---|---|
| 4,655,026 | 4/1987 | Wigoda | 53/55 |
| 4,672,554 | 6/1987 | Ogaki | 364/479 |
| 4,674,055 | 6/1987 | Ogaki et al. | 364/479 |
| 4,710,885 | 12/1987 | Littleken | 364/518 |
| 4,750,151 | 6/1988 | Baus | 364/900 |
| 4,787,050 | 11/1988 | Suzuki | 364/479 |
| 4,789,907 | 12/1988 | Fischetti et al. | 360/33.1 |
| 4,801,375 | 1/1989 | Padilla | 210/100 |
| 4,817,005 | 3/1989 | Kubota et al. | 364/468 |
| 4,817,043 | 3/1989 | Brown . | |
| 4,818,854 | 4/1989 | Davies et al. . | |
| 4,833,307 | 5/1989 | Gonzalez-Justiz | 235/375 |
| 4,873,643 | 10/1989 | Powell et al. . | |
| 4,899,292 | 2/1990 | Montagna et al. . | |
| 4,982,337 | 1/1991 | Burr et al. | 364/479 |
| 5,036,472 | 7/1991 | Buckley et al. . | |
| 5,053,956 | 10/1991 | Donald et al. . | |
| 5,056,029 | 10/1991 | Cannon . | |
| 5,172,245 | 12/1992 | Kita et al. . | |
| 5,243,174 | 9/1993 | Veeneman et al. . | |
| 5,327,265 | 7/1994 | McDonald . | |
| 5,513,116 | 4/1996 | Buckley et al. | 364/479 |
| 5,513,117 | 4/1996 | Small | 364/479 |
| 5,546,316 | 8/1996 | Buckley et al. | 364/479.03 |
| 5,552,994 | 9/1996 | Cannon et al. | 364/468.01 |
| 5,555,496 | 9/1996 | Tackbary et al. | 364/401 |
| 5,559,714 | 9/1996 | Banks et al. | 364/479.03 |
| 5,561,604 | 10/1996 | Buckley et al. | 364/479.03 |
| 5,600,563 | 2/1997 | Cannon et al. | 364/479.03 |
| 5,615,123 | 3/1997 | Davidson et al. | 364/479.03 |
| 5,687,087 | 11/1997 | Taggart | 364/479.03 |
| 5,717,597 | 2/1998 | Kara | 364/464.18 |

RGB color TIFF file from original scan

| |
|---|
| Tag Section<br>   photometricinterpretation = RGB |
| Image Data (RGB)<br>   3 bytes = 1 pixel |

Fig. 6

Print Palette color TIFF file

| |
|---|
| Tag Section<br>   Photometricinterpretation = Palette Color<br>   ImageWidth = 300 dots per inch resolution<br>   ImageLength = 300 dots per inch resolution |
| Color Palette<br>   256 entries of 24 bit colors |
| Image Data (Palette index values)<br>   1 byte = 1 pixel |

Fig. 7

Display Palette color TIFF file

| |
|---|
| Tag Section<br>   Photometricinterpretation = Palette Color<br>   ImageWidth = 85 dots per inch resolution<br>   ImageLength = 85 dots per inch resolution |
| Color Patette<br>   256 entries of 24 bit colors |
| Image Data (Palette index values)<br>   1 byte = 1 pixel |

Display Image File

| Signature |
|---|
| Image length (at 85 dots per inch resolution) |
| Image Width (at 85 dots per resulution) |
| Compression Block Size |
| Normalized Color Palette |
| Data Block #1 Compressed Size |
| Compressed Data Block #1 |
| Data Block #2 Compressed Size |
| Compressed Data Block #2 |

⋮

| Data Block #N Compressed Size |
|---|
| Compressed Data Block #N |

*Fig. 8*

Print Image File

| Signature |
|---|
| Image Length (at 300 dots per inch resolution) |
| Image Width (at 300 dots per inch resolution) |
| Data Block #1 Compressed Size |
| Compressed Data Block #1 |
| Data Block #2 Compressed Size |
| Compressed Data Block #2 |

⋮

| Data Block #N Compressed Size |
|---|
| Compressed Data Block #N |

*Fig. 9*

Card Description Database

Menu Database

Fig. 12

Card Description Database

File Header

| Version number |
|---|
| Number of cards |
| Number of repeated images |
| Credits |
| Reserved |

Card/Repeated Image Header

| Name |
|---|
| Deleted Flag |
| Card orientation |
| Type (card or repeated image) |
| Number of card components |

Card Image Component

| Card component type |
|---|
| Card side |
| X coordinate |
| Y coordinate |
| Image file designation |

Card Text Component

| Card component type |
|---|
| Card side |
| X coordinate |
| Y coordinate |
| Text Font |
| RGB color of text |
| Text string |

Card User Text Component

| Card component type |
|---|
| Card side |
| X coordinate |
| Y coordinate |
| Text Font |
| RGB color of text |
| Number of input lines |
| Type of user input |

Card Repeated Image Component

| Card component type |
|---|
| Name of Repeated Image |

SYSTEM FOR PRINTING SOCIAL EXPRESSION CARDS

This is a continuation of application Ser. No. 07/949,715 filed on Sep. 23, 1992 U.S. Pat. No. 5,600,563.

BACKGROUND OF THE INVENTION

1. Field of the Invention

The present invention relates generally to the field of greeting cards. More specifically, the present invention discloses a system for creating a database of available greeting card designs that then can be manufactured through on-site printing units.

2. Statement of the Problem

Greeting cards or social expression cards have traditionally been manufactured in large quantities by various manufacturers at locations remote from the point of purchase or retail outlet. Social expression cards include greeting cards, invitations, announcements, and the like and are referred to herein as "greeting cards" or "social expression" cards. After manufacture, the cards are shipped, either directly or through wholesale distributors, to a variety of retail outlets, such as specialty card shops, drug stores, grocery stores, and the like where they are displayed and sold to retail customers.

One of the most significant problems associated with the remote manufacture of greeting cards is the very large amount of inventory needed at the point of sale, and the space required to properly display the inventory of greeting cards. For example, most greeting cards are displayed on card racks that group the cards into a number of categories, or fields, to assist a customer in locating the type of card desired. Typically, a large display rack is needed to expose a sufficient portion of the face of each card to allow easy scanning by the customer of the various cards available in a particular category or field.

A number of systems have been invented in the past to provide on-site manufacture or customization of social expression cards and the like, including the following:

| Inventor | Patent No. | Issue Date |
| --- | --- | --- |
| Cannon | 5,056,029 | Oct. 8, 1991 |
| Buckley, et al. | 5,036,472 | July 30, 1991 |
| Montagna, et al. | 4,899,292 | Feb. 6, 1990 |
| Powell, et al. | 4,873,643 | Oct. 10, 1989 |
| Brown | 4,817,043 | Mar. 28, 1989 |
| Ciarlo | 3,949,375 | Apr. 6, 1976 |

"CreataCard" system introduced by Custom Expressions, Inc., Glendale, California, in May, 1990.

U.S. Pat. No. 5,056,029 was previously issued to one of the present inventors less than one year prior to the filing date of this application. This patent discloses a system for manufacturing and vending social expression cards that queries the customer to input a series of special occasion parameters to select a card from a database of available card designs.

The "CreataCard" system was introduced by Custom Expressions, Inc. in May, 1990. This system is an on-site unit that guides customers through a series of card selections on a touch-sensitive display screen. After choosing the desired style of card, the customer enters information to personalize the card, such as names, dates, ages, messages, etc. it is believed that the card information is stored in vector graphic format since the card is drawn line-by-line using an eight-color pen plotter.

Buckley, et al., disclose a computer controlled machine for vending personalized greeting cards and the like. The unit provides audio and video presentations of the products and options available to the customer. Base products such as pre-printed forms are stored within the unit for transfer by a robotic arm to a printer for customization.

Brown discloses an information kiosk with a video display that provides instructions and information to users. The user enters choices on a keypad input device. The kiosk can also provide textual or graphic printed information.

Powell, et al., disclose an interactive design terminal for custom imprinted articles, such as T-shirts and the like. A memory stores a library of available design elements and a set of design rules for combination of the design elements in accordance with selections made by the operator.

Ciarlo discloses a computer system for readily dispensing information, such as information on travel, entertainment, accommodations and the like.

Montagna, et al., disclose a system for storing and retrieving text and associated graphics. Graphic images are stored in compressed digital format. Graphic images can be tied into specific points in a menu structure as shown in FIG. 3.

There are also a number of commercially available software programs that allow personal computer systems to print greeting cards. For example, "Card Shop" by Artsci, Inc. allows MacIntosh computer users to select from a menu of fifty greeting cards covering a variety of occasions. "Greeting Card Maker" by Artivision, Inc. allows Apple computer users to print cards, invitations, and announcements. Also, "The Print Shop" by Broderbund, Inc. allows IBM-PC users to create and print greeting cards.

In addition to these references, a wide variety desktop publishing software, e.g. Aldus Pagemaker and QuarkXPress, has long been commercially available for conventional personal computers. Desktop publishing systems allow a trained user to create virtually any type of custom publications, primarily such as newsletters and brochures. However, it is possible to create custom greeting cards, invitations, business cards and the like using a desktop publishing system.

3. Solution to the Problem

None of the prior art references uncovered in the search show a system for printing social expression cards in which card images are stored as a set of display images in a format to facilitate rapid display on a color monitor, and as a corresponding set of print images in a format to rapidly produce high resolution printed cards. In addition, the system includes a card description database that defines each card in terms of its component images, text, and fields for personalization.

SUMMARY OF THE INVENTION

This invention provides a system for printing social expression cards that includes both a database preparation computer system and a plurality of remote card printing systems. The database preparation computer system uses a scanner to input graphic images from a plurality of cards, or a computer software program to create a plurality of images for use in card designs. A high resolution print image and a lower resolution display image are created from each of these images. A card description database defines the layout of each card in terms of its component images and their locations on the card. The database preparation unit can also build a menu database defining a structure of menu screens to query the user to select a desired category of cards (e.g.

birthday cards, anniversary cards, get well cards). A list of card designs is linked to categories in the menu database. The databases and image files are then copied onto removable data storage media for distribution to each of the card printing units. A typical card printing unit has a display, a color printer, input means (e.g. a keyboard or trackball), data storage means for reading the removable data storage media, and a computer processor. The processor uses the menu database to prompt the customer to select a desired category of cards. The processor uses the card description database to selectively retrieve and display images of cards linked to the selected category using the display images. If the card printing system user selects a card to be printed, the processor retrieves and prints the print images for the selected card.

A primary object of the present invention is to provide a card printing system capable of rapidly displaying card images to card printing system users and also producing high-resolution printed cards.

Another object of the present invention is to provide a card printing system for creating a card description database in which each card is defined in terms of its component images, text, and fields for personalization.

Yet another object of the present invention is to provide a card printing system having a menu database that enables a card printing system user to specify a desired category of card designs, and then displays images of cards that have been linked to that category.

These and other advantages, features, and objects of the present invention will be more readily understood in view of the following detailed description and the drawings.

BRIEF DESCRIPTION OF THE DRAWINGS

The present invention can be more readily understood in conjunction with the accompanying drawings, in which:

FIGS. 2 and 2a is a flow chart of the overall method of this invention.

FIG. 5 is a diagram of the structure of the RGB color TIFF file produced from the images scanned by the color scanner.

FIG. 6 is a diagram of the structure of the print palette color TIFF file generated from the image file shown in FIG. 5.

FIG. 7 is a diagram of the structure of the display palette color TIFF file generated from the image file shown in FIG. 5.

FIG. 8 is a diagram of the structure of the compressed display image file generated from the display image file shown in FIG. 7.

FIG. 9 is a diagram of the structure of the compressed print image file generated from the print image file shown in FIG. 6.

FIG. 12 is a diagram of the various possible components of the card description database.

DETAILED DESCRIPTION OF THE INVENTION

Figure 1:
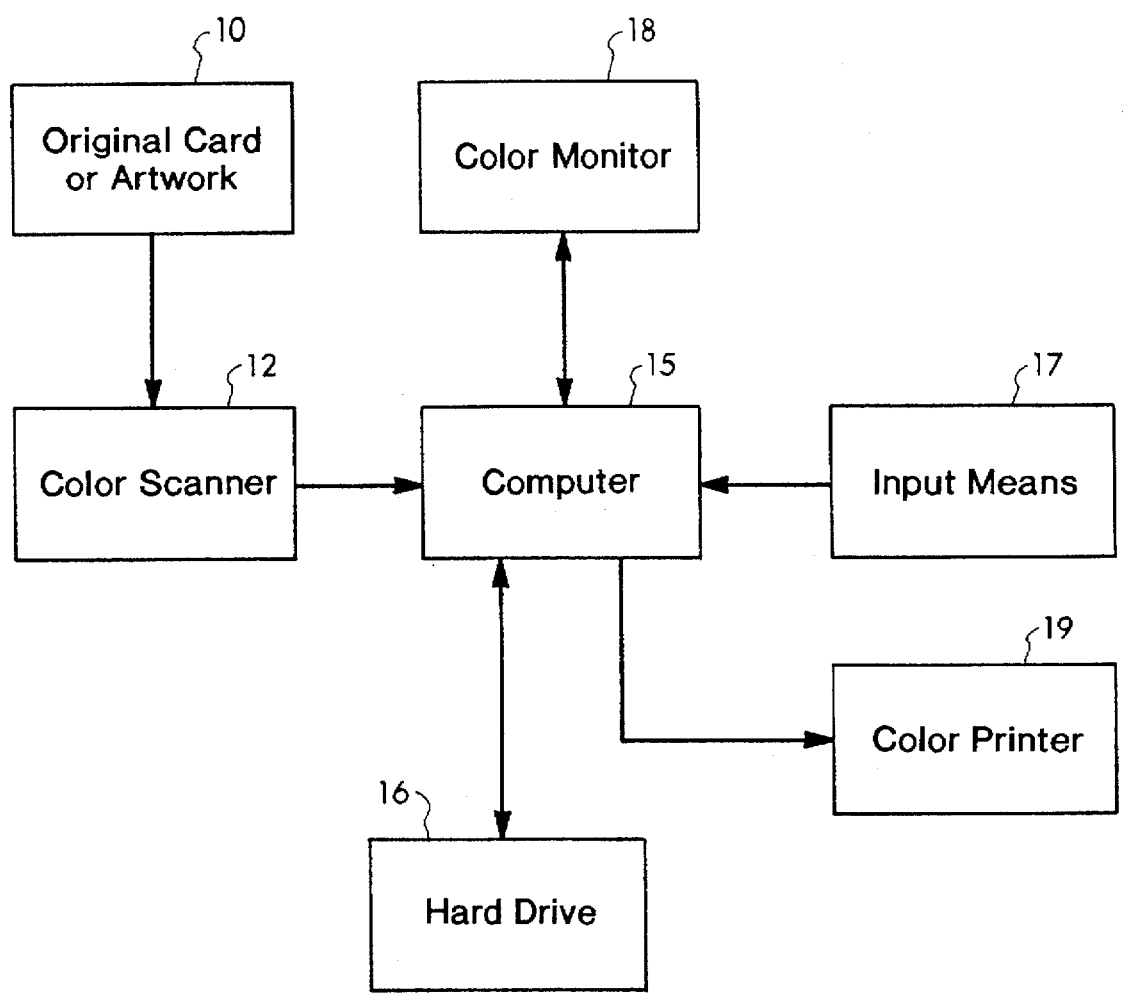
FIG. 1 is a schematic diagram of a computer system used in preparing social expression card designs by the process of this invention.

FIG. 1 shows an overall schematic view of the computer system used to prepare databases of social expression card designs. The steps in this process are outlined in the flowchart provided in FIGS. 2 and 2a. Copies of these databases are then distributed via CD-ROM or other removable storage media to a large number of card printing systems shown in FIG. 3 that print cards at remote sites.

Figure 2:
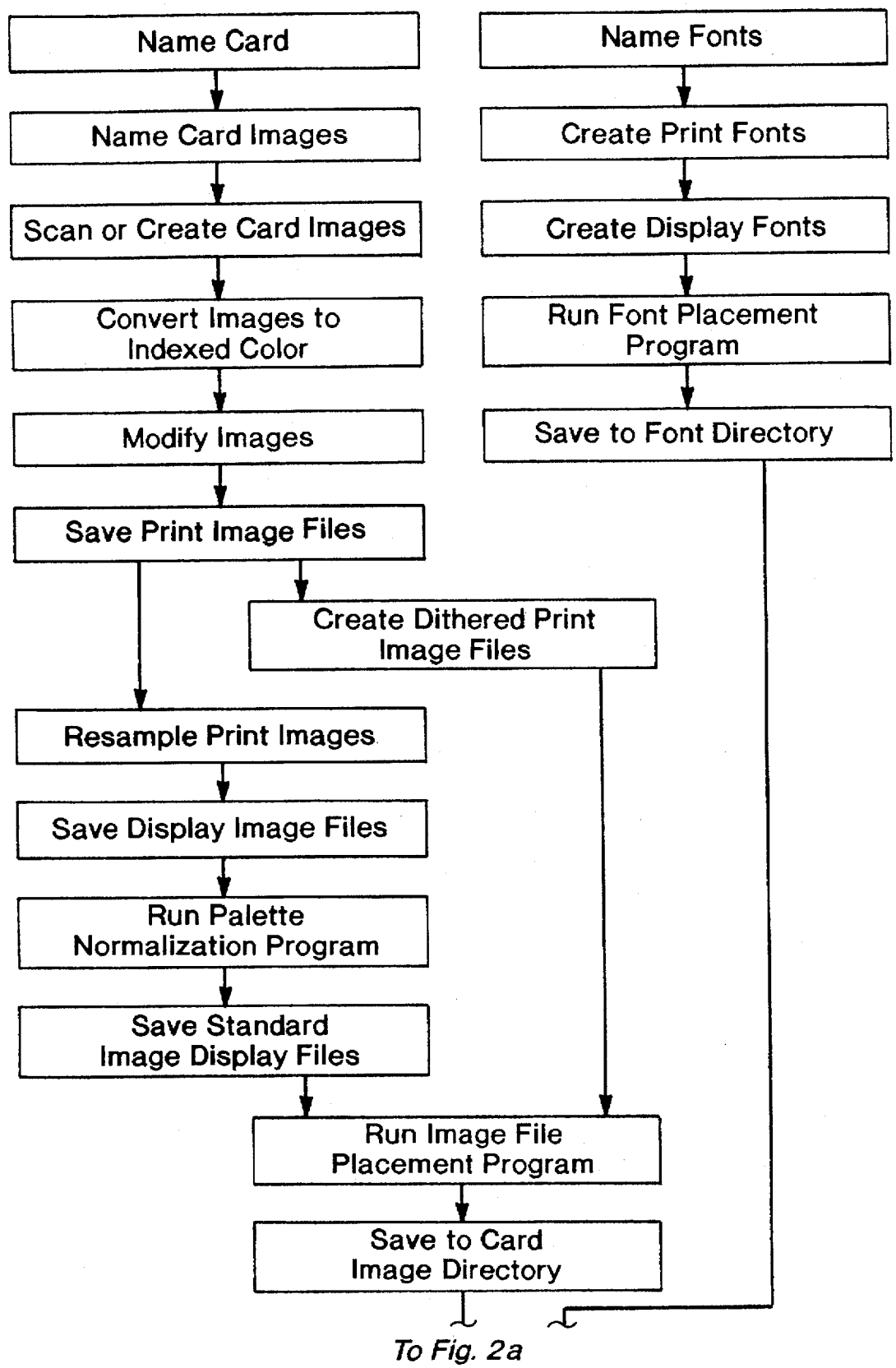
Figure 2:
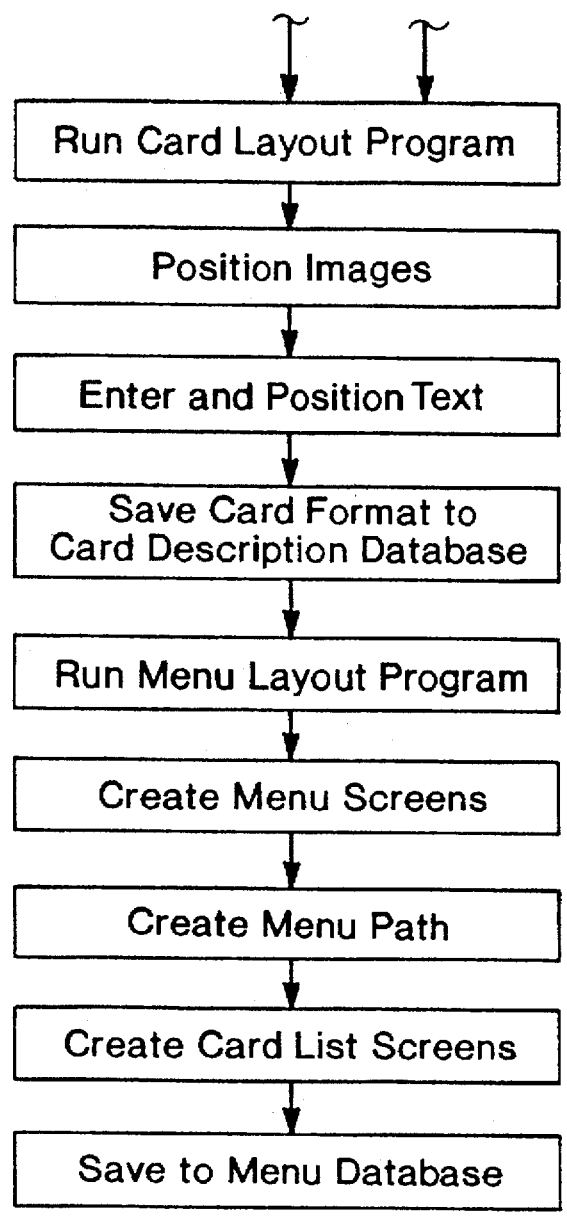

Turning to FIGS. 1, 2, and 2a, each original social expression card is viewed and the publisher name and publisher's card number on the card is noted. For example, card number 150 published by David Mekelburg and Friends. If original art images (i.e. images created using artistic media including computer paint programs) are being used, card numbers are assigned serially to each submission from an artist or other source. A three letter publisher code is assigned to the publisher ("publisher code"). For example "DMF" for David Mekelburg and Friends.

The card is then named using the publisher code followed by no more than four numerals ("card name"). For example, the card name for card number 150 published by David Mekelburg and Friends is DMF0150. Each image on the original card ("original card image") including the front panel, inside panel and back panel images, is named with the card name followed by a number indicating the order in which the image appears on the card ("image name"). For example, DMFO1501 would be the image name for the first image on card number 150 published by David Mekelburg and Friends.

Any image that appears in the same location on more than one card ("repeated image"), such as a logotype, is named with the publisher code followed by a four letter code and a single numeral indicating the order in which the repeated image appears on the card relative to other repeated images on the same card ("repeated image name"). For example, DMFLOGO1 is the repeated image name for the first repeated image to appear on card number 150 published by David Mekelburg and Friends.

Except for original art images created using computer paint programs ("computer art images") all images on original cards 10 are scanned using a color scanner 12, such as the Microtek 600Z ScanMaker (Microtek International, Inc. No. 6, Industry East Road 3, Science-based Industrial Park, Hsinchu, Taiwan 30077, R.O.C.) connected to a computer 15 such as an IBM PC compatible having eight megabytes of random access memory (RAM) which in turn is connected to one or more large capacity memory devices 16, such as a 1.2 gigabyte Micropolis Model 1598-15 hard drive (Micropolis, Inc., Chatsworth, Calif.). The computer also includes input means 17, such as a keyboard, mouse, or trackball. Optionally, a color printer 19 can also be included.

Scanning is typically done at 300 dots per inch (dpi) and 24 bits per pixel. Scanned image files resulting from the scanning process and computer art image files are stored in directories identified by a publisher code. For example, the directory for the publisher David Mekelburg and Friends is named DMF. Individual image files are saved in the appropriate publisher directory under the image name previously assigned.

Each scanned image file or computer art image file is then opened in a digital image processing program, such as Aldus Photostyler (Aldus Corporation, 411 First Avenue South, Seattle, Wash. 98104-2871). Scanned images are displayed on a color monitor 18, such as a Goldstar Model 1460 Plus (Goldstar Co., Ltd., Lucky-Goldstar Twin-Tower, 20 Yeouido-dong, Yeongdungpo-gu, Seoul, 150-606, Korea) capable of displaying images in at least 256 colors.

The scanned image or computer art image is saved in a file in RGB (red, green, blue) true color format as shown in FIG.

5, which may contain up to 16.7 million colors. Each pixel in the image requires three bytes of storage. The capability of the monitor and video card used in the system will determine how many of the colors in an RGB true color file will be displayed. For example, the Goldstar Model 1460 Plus monitor used with a VGA Integra card (ATI Technologies, Inc.) will display 256 of the 16.7 million colors possible in the RGB true color file. The displayed scanned image or displayed computer art image is then converted to a format with a limited palette of colors ("indexed color image"). This is accomplished in Aldus Photostyler by selecting "Indexed 256-color" from the image menu which creates an indexed color image with a palette of 256 colors. Before completing the conversion when Aldus Photostyler is used, the type of color palette to be created is specified as "Adaptive" to best simulate the colors in the original image.

If necessary, the indexed color image is cropped. This is accomplished in Aldus Photostyler using a cropping tool to select an area to be saved. The indexed color image size is checked to determine if it will fit within a defined area. For example the area could be defined as a four inch by six inch rectangle. If the image is larger than the defined area, it should be reduced to four inches by six inches. This is accomplished in Aldus Photostyler by selecting the area to be resized and then choosing "Resize" from the Transform menu and entering the appropriate dimensions.

Typically, when an original card image or original art image on a white background is scanned, the white background of the displayed indexed color image contains a number of random colored pixels. These colored pixels must be removed. This can be accomplished in Aldus Photostyler by selecting the white background area using the magic wand tool and then choosing the "Clear" command from the Edit menu.

When an original card image or original art image having areas of a single color is scanned, the corresponding areas of the displayed indexed color image will contain a large number of pixels of varying colors. These pixels should be changed to a single color which is the same as the single color area on the original card image or original art image. This can be accomplished in Aldus Photostyler by selecting the dominant pixel color in a single color area of a displayed image with the eyedropper tool. This color is identified as the fill color. The color area to be made into a single color is then selected using the magic wand tool. The "Fill" command is then chosen from the Edit menu and the selected area is automatically filled with the dominant pixel color previously chosen with the eyedropper tool.

When modification of the indexed color image is completed, the image is saved in two different formats, (1) a print image file which will be processed to create files which can be used by a color printer ("dithered print image file") and (2) a display image file which can be displayed on a color monitor. The print image file is saved to the hard drive in a color image file format such as Tag Image File Format (TIFF) as shown in FIG. 6. In addition, if a minimum amount of memory space is to be used, the file can be compressed using, for example, the Lempel-Zev and Welch (LZW) compression algorithm. The file is identified with the image name followed by the extension .PCP ("Print image file name"). For example, DMF01501.PCP is the print image file name for the first print image on card number 150 published by David Mekelburg and Friends. The print image files are typically saved to a separate directory.

The hue and saturation of palette colors associated with each print image file must be adjusted to new values (i.e., color corrected) so the printed output will match the colors of the original card image or original art image. This is accomplished with a color correction program, such as Colorcorrect (SuperVend, Inc., 228 Barberry Place, Loveland, Colo., 80537) which generates new palette colors by automatically applying red, green, and blue color correction curves to each color in the indexed color image palette. The details of color correction are well known in the art and therefore need not be explained here.

To allow rapid printing, print image files should be modified with a dithering program, for example Ditherimage (SuperVend, Inc.) before they are used by a color printer in a card printing system. In an indexed color image, each pixel is represented by an index number that corresponds to an entry in a 24 bit color table containing 256 colors of a possible 16.7 million colors. The process of dithering reduces an indexed color image to a 4 bit color image (dithered print image). The dithered print image matches the subtractive primary colors (i.e., cyan, magenta, and yellow) plus black used by the printer. To compensate for this loss of color resolution, a dithering algorithm is used. A dithered print image uses an N by N matrix (for example 5 by 5), of cyan, magenta, yellow or black pixels ("dither matrix") to represent the 24 bit color value of each indexed color image pixel. Individual dither matrix color pixels have varying values so the color of the matrix is perceived by the human eye as an approximation of the original pixel color in the indexed color image.

In addition to dither matrix creation, the dithering program overlaps adjoining dither matrices. This is necessary because the indexed color image has a resolution of 300 dpi which matches the printer resolution. If no overlapping of dither matrices was done and, for example, a 5 by 5 dither matrix was used, the resulting dithered image would have one twenty-fifth the spatial resolution of the indexed color image. By overlapping the dither matrices, the color value of each 4 bit pixel is averaged between all overlapping pixels. This overlapping gives the completed dithered print image a blended appearance that is visually pleasing. The details of image dithering are well documented (J. D. Foley & A. Van Dam, *Fundamentals of Interactive Computer Graphics*, Addison-Wesley Publishing Co., 1984, pages 593–602). In conventional systems, dithering is done by the color printer after the image data has been downloaded from the computer to the printer and before the image is printed. In the present system, the print image is pre-dithered before the print image file is stored. This results in more rapid printing and also reduces the size of the print image file.

Dithered print image files are identified with the image name followed by the extension .PCD ("dithered print image file name"). For example DMF01051.PCD is the dithered print image file name for the first dithered print image on card number 150 published by David Mekelburg and Friends. Dithered print image files are then compressed using the LZW compression algorithm and saved in a proprietary format as shown in FIG. 9. To provide rapid retrieval from a large number of dithered print image files, dithered print image files are moved from the dithered images directory to a number of nested directories using a software program which automatically relocates the files ("image file placement program"). This can be accomplished by using a program such as Putimage (SuperVend, Inc.).

The display image file shown in FIG. 7 is also created from the print image. The resolution of display images must match the resolution of the color monitor they are to be displayed on. For example, one of the resolutions available on the Goldstar 1460 Plus color monitor is 800 pixels by 600 pixels. At this resolution, for a display image to appear at the same size as a printed image created with a dithered print image file, the display image must have a resolution of 85 dpi. An 85 dpi display image can be created from the 300 dpi print image in Aldus Photostyler by selecting "Resample" from the Transform menu and entering the resolution desired.

When the display image is saved it is processed by a palette normalization program, such as Fiximage (SuperVend, Inc.), which analyzes the color palette associated with each display image and transforms it, as shown in FIG. 8, into a palette having certain colors in specific palette locations ("standard color palette"). For example, red, green, blue, cyan, magenta, yellow, black and white are located in the first through eighth palette locations. The resulting file is then compressed using the LZW compression algorithm and saved in a proprietary format ("standard display image file") as shown in FIG. 8. The file is identified with the image name followed by the extension .DSC ("standard display image file name"). For example DMFO1501.DSC is the standard display image file name for the first display image on card number 150 published by David Mekelburg and Friends. To provide rapid retrieval from a large number of display image files, display image files are moved from the display images directory to a number of separate directories using a software program which automatically relocates the files ("image file placement program"). This can be accomplished by using a program such as Putimage (SuperVend, Inc.).

Two additional types of files which are created are print font files and display font files. A font is defined as a set size bitmap of a particular typeface. The resolution of print fonts must match the resolution of a particular printer (e.g. 300 dpi for the Tektronix Phaser III color printer). The resolution of display fonts must match the resolution of the color monitor they are to be displayed on. For example, one of the resolutions available on the Goldstar 1460 Plus color monitor is 800 pixels by 600 pixels. At this resolution, for a display font to appear at the same size as a print font, the display font must have a resolution of 85 dpi.

A six letter code is assigned the font ("font code"). For example, the font code for Howard Thin is HOWLSS. Each point size of the font is named by the font code followed by two numerals ("font name"). For example, the font name for 14 point Howard Thin is HOWLSS14. Print font files are identified with the font name followed by the extension .300 ("print font file name"). For example, HOWLSS14.300 is the print font file name for 14 point Howard Thin. Display font files are identified with the font name followed by the extension .085 ("display font file name"). For example, HOWLSS14.085 is the display font file name for 14 point Howard Thin.

Print fonts and display fonts can be created using a scalable font library, such as the Digi-Fonts, Inc. Typeface library and a font conversion program, such as Digi-Duit! (Digi-Fonts, Inc., 528 Commons Drive, Golden, Colo. 80401). Both print font files and display font files are saved to a directory named "Fonts" on the hard disk.

To provide rapid retrieval from a large number of font files, both display and print font files are moved from the fonts directory to a number of nested directories using a software program which automatically relocates the files ("font file placement program"). This can be accomplished by using a program such as PutFonts (SuperVend, Inc.). For example, when the font file placement program is run, the print font File HOWLSS14.300 and the display font file HOWLSS14.085 are automatically transferred from the fonts directory to a separate subdirectory.

Print images, display images and text used in a social expression card format must be positioned on the front, inside, or back panels of the social expression card using a software program with this capability ("card layout program"). This can be accomplished with a program such as Cardmaker (SuperVend, Inc.). For example, card number 150 published by David Mekelburg and Friends would be formatted using the Cardmaker software program by (1) selecting "image" from a menu. (2) The card name DMF0150 is entered. (3) The Cardmaker program assumes the social expression card is rectangular, for example four and one-half inches by six and one-half inches, so the card format must be designated as horizontal or vertical. (4) The desired panel for image placement is selected ("F" for front panel, "I" for inside panel or "B" for back panel). (5) The image name DMF01501 is entered (the first image on the front panel). (6) The image position is entered ("C" for center of panel, "T" for top of panel, "B" for bottom of panel, "L" for left side of panel, "R" for right side of panel, or specific x and y coordinates are entered). Positioning of the first image would be completed at this point. Additional images are positioned by repeating steps three through five.

Text is entered and positioned on the social expression card format by (1) selecting "Text" from a menu. (2) Selecting the panel on which the text is to be placed. (3) Entering the text position by selecting "C" for center of panel, "T" top of panel, "B" bottom of panel, "L" left side of panel, "R" right side of panel, or by entering specific x and y coordinates. (4) Selecting the text font and point size from a list of fonts and point sizes. For example, 1035 Avon Book, 16 point. (5) Selecting the text color from a list of available colors. For example, black, white, red, blue, magenta, green, or cyan. (6) Entering the text, for example "Happy Birthday", using the keyboard 17.

If an area for personalized text to be entered by card printing system users is to be specified, this is accomplished by (1) choosing "Personalized Text" from a menu. (2) Selecting the panel where personalized text is to be placed. (3) Entering the text position by selecting "C" for center of panel, "T" for top of panel, "B" for bottom of panel, "L" for left side of panel, "R" for right side of panel, or by entering specific x and y coordinates. (4) Selecting the text font and point size from a list of fonts and point sizes (e.g. 1318 Howard Thin, 14 point). (5) Selecting the text color from a list of available colors (e.g. black, white, red, blue, magenta, green, or cyan). (6) Entering the number of lines of personalized text to be allowed (e.g. six lines). The card printing system control program determines, at the time user text is input, how many characters can be placed on each line given the font specified in the card description database.

Figure 10:
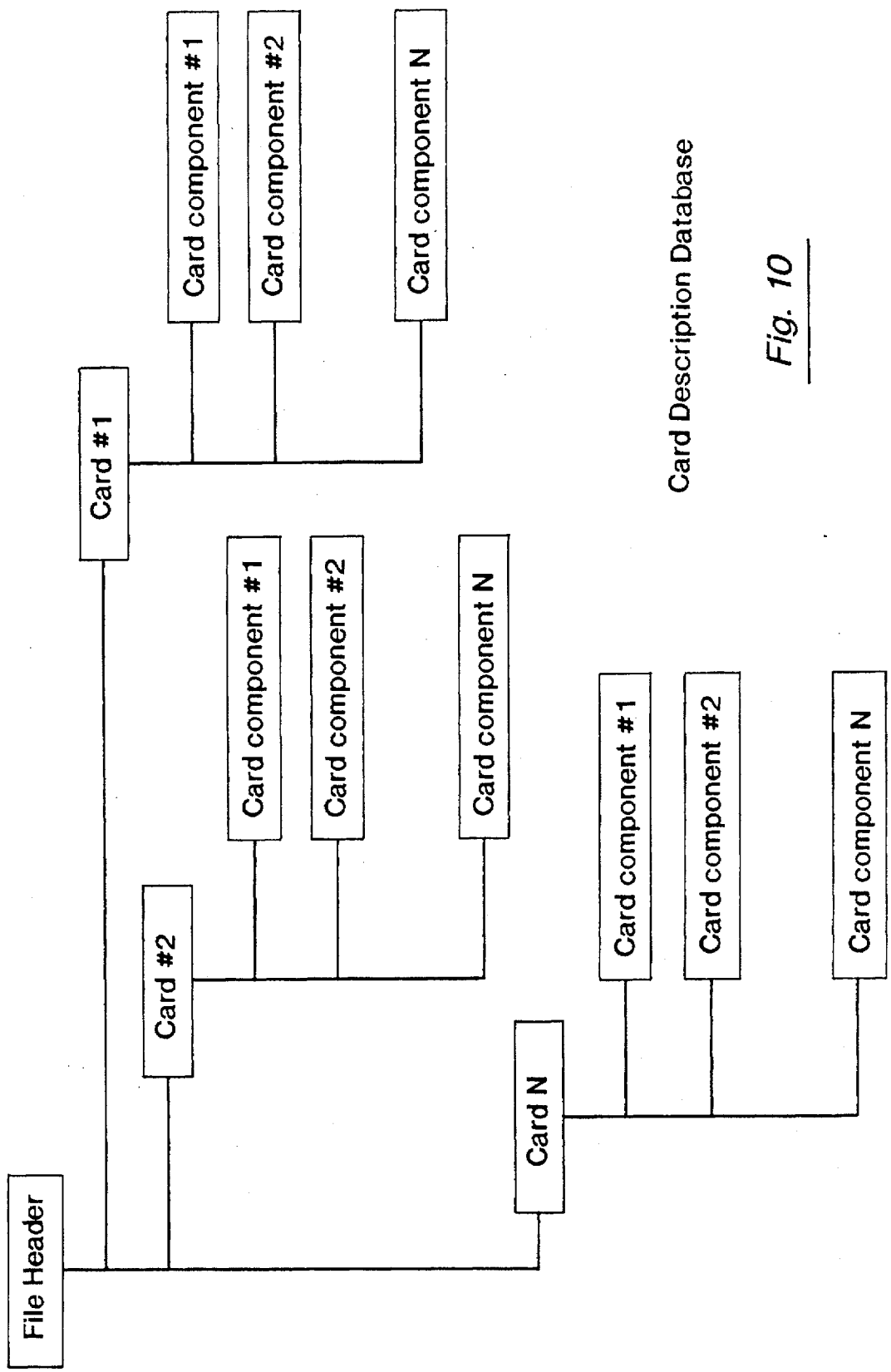
FIG. 10 is diagram of the structure of the card description database.

The front, inside, and back panels are individually viewed on the monitor display 18 to assure that images and text are properly positioned. If modifications are required, the appropriate steps are repeated. Card formats created by the card layout program are automatically saved under the card name to a database ("card description database") as shown in FIG. 10. Each card in the card description database is defined in terms of its components, such as images, text, and personalization fields (or card user text). FIG. 12 shows how each type of component is defined within the card description database.

One preferred method of retrieving card images for display and selection by users of a card printing system is through a series of displayed menus that allow the user to describe in a progressive manner, through selection of a word, phrase or icon ("special occasion parameter" or "card parameter"), the type of social expression card desired. For example, the user may first be asked to select a general class of cards, such as "Birthday", "Anniversary", "Get Well", etc. If "Birthday" is selected, the user is then prompted to select a sub-classification of birthday cards, such as "Relative", "Children", or "Humorous". This menu process continues to prompt the user to select special occasion parameters until a single end category of cards is reached. Upon selection of a category, one or more card images linked to the category are retrieved and displayed on the color monitor.

Figure 11:
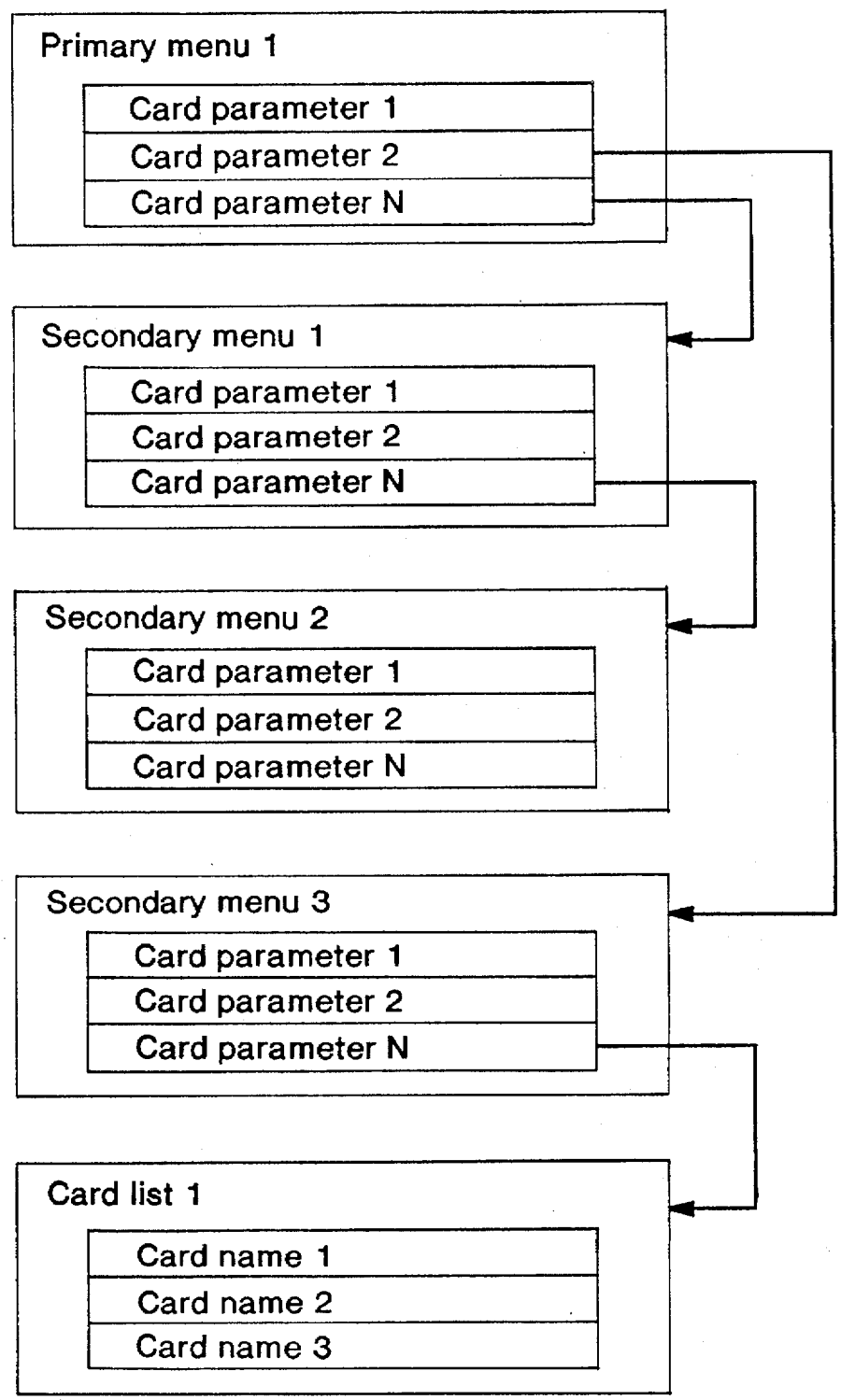
FIG. 11 is a diagram of the structure of the menu database.

Creating a menu which allows rapid retrieval of social expression card images requires a software program ("menu layout program") capable of constructing a menu display ("primary menu screen") and sub-menu displays ("secondary menu screens"). One or more card parameters displayed on the primary menu screen are linked to card parameters displayed on secondary menu screens. Ultimately, the last card parameter in a series of menu screens ("menu path") is linked to a group of card names that can be used to retrieve card designs to be displayed to the card printing system user. The structure of a typical menu database is shown in FIG. 11. The program also allows the entry of text which appears at the top of each screen ("screen title") to instruct the user, (for example, "Choose a Category") or inform the user of their present location in the menu path (for example, "Birthday/Relative/Son"). Cardmaker is such a program (SuperVend, Inc.). In the Cardmaker program menu screens are created in a menu creation mode where a card parameter's text is entered and then displayed in a white rectangle (menu creation screen). Rectangles containing card parameter text are displayed in rows each containing a maximum of four rectangles. A maximum of six rows may be entered on a menu creation screen. If more than three rows are entered, a second primary menu screen will be created, and the two screens are inter-linked. The card printing system user can view the primary menu screens alternately by selecting a "More Choices" button.

Before any card parameter is entered, text for the screen title on the menu screen must be entered on a keyboard (e.g. "Choose a Category"). The first card parameter is then (1) selected from card parameters which have previously been entered and are displayed on the menu creation screen (e.g. "Birthday", "Anniversary", or "Wedding") or (2) if no card parameters have been previously entered or none of those previously entered are suitable, a new card parameter is entered using a keyboard (e.g. "Blank").

Card parameters may be displayed on menu screens in a variety of formats. For example, the Cardmaker program may display card parameters as blue text in white rectangles (or buttons) two inches wide by one inch high against a blue background. Menu screens may contain from one to twelve buttons. The arrangement of buttons on the menu screen depends on the number of buttons present. For example, if twelve buttons are present they may be displayed in three rows each containing four buttons. If three buttons are present, they may be displayed in a single column in the center of the menu screen.

The relative position of card parameters on menu screens can be arranged with the menu layout program. For example, if two card parameters had been entered for display on the first menu creation screen and one other card parameter was already present, the three card parameters would be displayed on the primary menu screen in a column of three buttons with the top button containing the card parameter which was already present and the middle button containing the first new card parameter entered. The second new card parameter would appear as the bottom button. Any time after a card parameter is entered, its relative position on the buttons which appear on a menu screen can be changed by (1) entering the menu creation mode, (2) selecting a rectangle containing a card parameter whose position is to be altered, (3) holding down the "ALT" key on the keyboard and pressing the "M" key, (4) then selecting the card parameter which the previously selected card parameter is to appear before or after and (5) then selecting either "Before" or "After" from a menu display.

After the primary menu screen has been completed, a secondary menu screen can be created in the menu creation mode by selecting a card parameter which appears on the first menu screen and entering "Return" on the keyboard. A second menu creation screen is then displayed. A secondary menu screen is always linked to a card parameter displayed on another screen. Screen titles and card parameters are entered on secondary menu screens in the same manner as on the primary menu screen.

After one or more secondary menu screens linked by card parameters have been created, a card list screen is created. This is accomplished in the Cardmaker program when a menu creation screen is displayed which has no card parameters displayed. The menu creation screen is changed to a card list screen by holding down the "ALT" key on the keyboard and pressing the "C" key. Card names of cards to be displayed in association with a specific menu path are entered on one or more screens listing the names of cards in the order in which they are to be displayed (card list screen). For example, the menu path for card number 150 published by David Mekelburg and Friends is Birthday/Relative/Son. The card name to be entered is DMF0150. A card name is entered by (1) holding down the "ALT" key on the keyboard and pressing the "L" key, and (2) selecting the desired card name from a list of available card names (card name list). Only card names found in the card description database appear in the card name list.

Any time after card names are entered, the order in which they will be displayed can be changed by (1) entering the menu creation mode, (2) displaying the appropriate card list screen (3) selecting a card name whose position is to be altered, (4) holding down the "ALT" key on the keyboard and pressing the "M" key, (5) then selecting the card name which the previously selected card name is to appear before or after (6) pressing the "Return" key on the keyboard and (7) then selecting either "Before" or "After" from a menu display.

Card parameters can be deleted from menu creation screens and card names from the card list screens by (1) selecting the card parameter or card name, (2) holding down the "ALT" key on the keyboard and (3) pressing the "D" key. The file created using the menu layout program (menu database) is automatically saved to the hard disk.

After these databases have been prepared by the computer system, this data must be distributed to the card printing systems in the field. Due to their size, the dithered print image files, standard display image files, print font files, display font files, card description database, and menu database must be transferred to a large capacity memory means. While a variety of such devices might be used, an optical compact disc read only memory (CD-ROM) is the preferred means because (1) it will store approximately 640 megabytes of data, (2) can be produced in quantity at a low cost, (3) the data on the compact disc cannot be altered, (4) compact discs can be easily replaced in the field and (5) CD-ROM drive devices are relatively inexpensive compared to other drive devices. Techniques for producing a CD-ROM are well known and need not be explained here. Alternatively, other types of optical or magnetic disks or similar media can be used.

Figure 3:
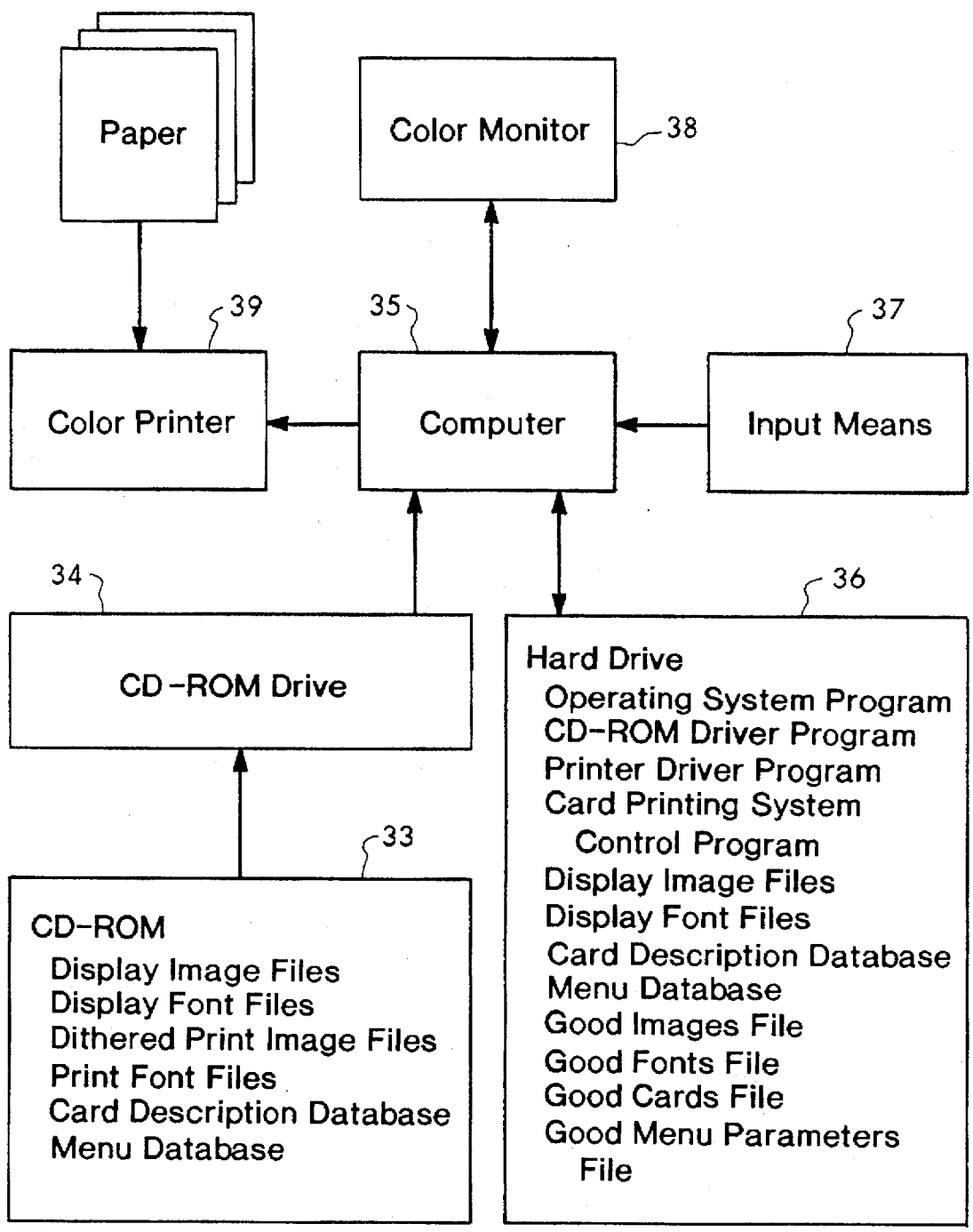
FIG. 3 is a diagrammatic view of a card printing system used in on-site printing of social expression cards.

As shown in FIG. 3, each card printing system contains a computer system which includes (1) an IBM PC or compatible computer 35 (CPU) with a large quantity of RAM, for example, eight megabytes, (2) a hard disk 36, for example a Seagate Model ST1239A 211 megabyte hard drive (Seagate, 920 Disc Drive, Scotts Valley, Calif. 95066), (3) a CD-ROM drive 34 and a CD-ROM drive controller card, for example a Sony CD-ROM Drive, Model CDU-53501 (Sony Corporation of America, P.O. Box 60590, Los Angeles, Calif. 90060), (4) a graphics adapter card, for example, an ATI Technologies VGA Integra graphics adapter (ATI Technologies, Inc., 3761 Victoria Park Avenue, Scarborough, Ontario, Canada M1W 3S2), (5) a color monitor 38, for example, a Goldstar Model 1460 Plus (Goldstar Co., Ltd., Lucky-Goldstar Twin-Tower, 20 Yeouido-dong, Yeongdungpo-gu, Seoul, 150-606, Korea), (6) a keyboard 37, for example, a Marquart Series 7065 MiniBoard (Marquart Switches, Inc., 2711 Route 20 East, Cazenovia, N.Y. 13035) and/or other input means, such as a trackball, for example, a Happ Model 56-5500-11 Trackball (Happ Controls, Inc., 106 Garlisch Drive, Elk Grove Village, Ill. 60007), (7) a color printer 39, for example a Tektronix Phaser III Color Printer, Model 4698RX (Tektronix, Graphics Printing and Imaging Division, 26600 S.W. Parkway, Wilsonville, Oreg. 97070), and (8) a direct memory access printer interface card, for example, a SuperVend DMA card. A floppy disk controller, IDE drive interface adapter card, and a floppy disk drive can also be included. Each card printing system is typically housed in either a single kiosk, or a printer enclosure and one or more display and input enclosures that can be placed in card shops, supermarkets, and other locations where greeting card are commonly sold.

The computer system hard drive in the card printing system contains (1) an operating system program, for example DOS 5.0 (Microsoft Corporation, One Microsoft Way, Redmond, Wash. 98052), (2) a CD-ROM driver program, (3) a printer driver program, and (4) a card printing system control program, for example, Cardfinder (SuperVend, Inc.).

Figure 4:
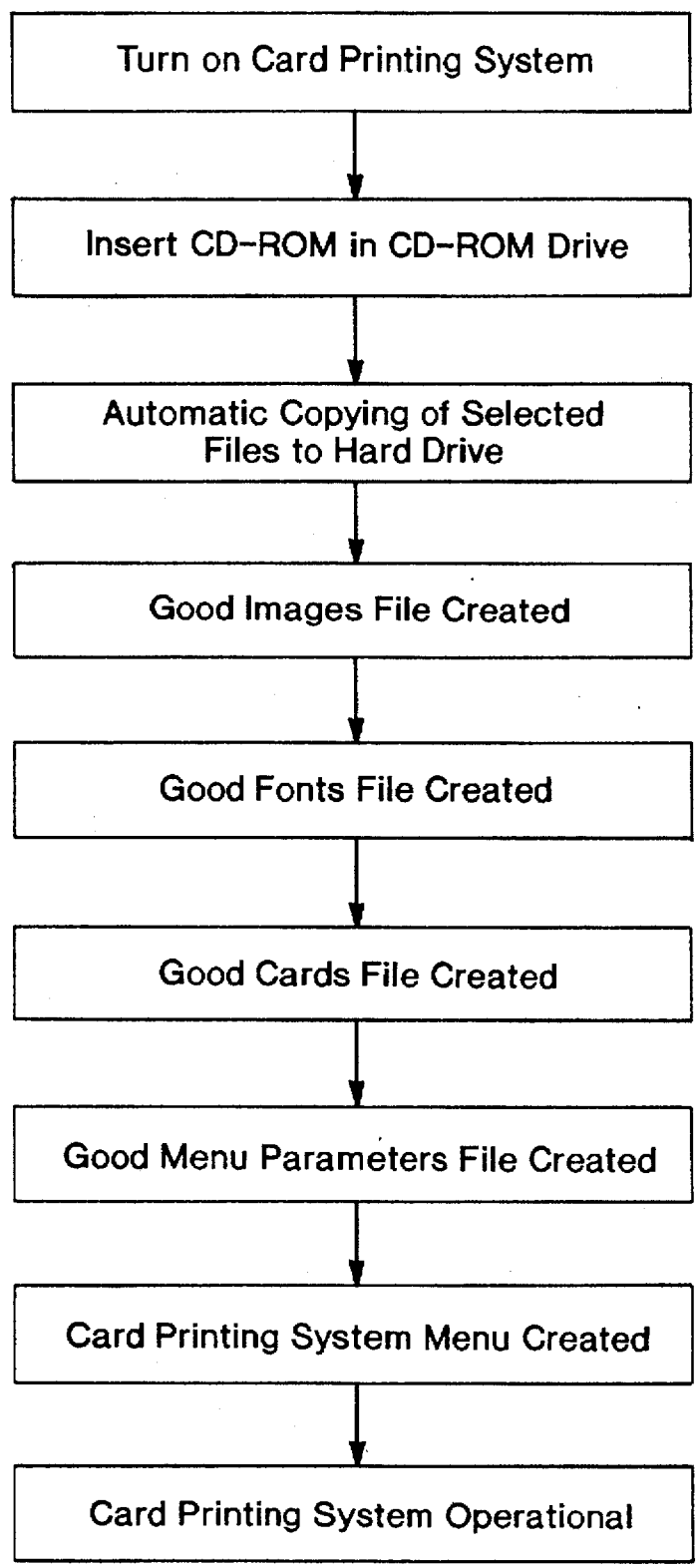
FIG. 4 is a flow chart of the method used by this invention to configure a card printing system.

As shown in FIG. 4, when a CD-ROM 33 is installed in a card printing system's CD-ROM drive 34, the card printing system control program on the hard disk drive 36 transfers from the CD-ROM 33 to the hard disk drive 36 any standard display image files and display font files that are not already on the hard disk drive. The card printing system control program analyzes the card descriptions contained in the card description database, the menu descriptions contained in the menu database, the standard display image files and display font files present on the hard disk drive and, the dithered print image files and print font files present on the CD-ROM and creates four files: (1) a file indicating which standard display images and dithered print images are present ("good images file"), (2) a file indicating which display font files and print font files are present ("good font files"), (3) a file indicating which card formats in the card description database have all the files present that are necessary to display card images and print cards ("good card file"), and (4) a file indicating which card list screens have at least one card name listed that is also listed in the good card file ("good menu file"). The good menu file is used to determine which card parameters will be displayed on the menu screens of the card printing system.

The card printing system is then operational. The computer processor 35 uses the menu database to display menus to allow the card printing system user to select a desired category of social expression cards. The menu path designated by the user is linked to a set of card names in the selected category. The computer retrieves the display image files and display font files for these cards and then composes and displays images of each card for the user using the format data for the card in the card description database. If appropriate, the card can be personalized with information input by the user, in accordance with format data stored in the card description database. If the user selects a card to be printed, the computer retrieves the corresponding print image files and print font files, composes the card image in accordance with the card description database, and then prints the card on the color printer 39.

The above disclosure sets forth a number of embodiments of the present invention. Other arrangements or embodiments, not precisely set forth, could be practiced under the teachings of the present invention and as set forth in the following claims.

We claim:

1. A method of processing images to define social expression cards in a computer database system comprising the following steps:

inputting images for each card;

creating a high-resolution print file for each of said images;

creating a lower-resolution display file for each of said images; and creating a card description database defining the layout of each card in terms of its component images and their locations on the card, to permit retrieval of said print files and said display files for each card.

2. The method of claim 1, wherein said card description database further comprises information for each card concerning the location, size, font and color of text on the card.

3. The method of claim 1, wherein said card description database further comprises information on fields that can be personalized for each card.

4. The method of claim 1 further comprising the following steps:

creating a menu database defining a plurality of categories of social expression cards; and linking the social expression cards in said card description database to at least one of said categories in said menu database.

5. A system for printing social expression cards comprising:

a database preparation computer system having:

(a) means for inputting graphic images for each of said cards;

(b) means for creating a high-resolution print image file for each of said images;

(c) means for creating a lower-resolution display image file for each of said images;

(d) means for creating a card description database defining the layout of each card in terms of its component images and their locations on the card;

(e) means for creating a card parameter database defining a series of card parameters associated with certain of said cards in said card description database; and (f) data storage means for creating multiple copies of said card parameter database, card description database, print image files, and display image files on removable data storage media; and at least one card printing system having:
  (a) display;
  (b) a printer;
  (c) input means;
  (d) data storage means for reading said removable data storage media; and
  (e) processor means for using said card parameter database and said card description database to selectively retrieve display image files of cards from said data storage means and display said display images on said display; allowing a user to select a desired card via said input means; retrieving print image files for said selected card from said data storage means; and printing said print images on said printer.

6. The system of claim 5 wherein said data storage means comprises a CD-ROM.

7. The system of claim 5 wherein said data storage means comprises a hard disk drive.

8. The system of claim 5, wherein said card description database further comprises information defining any text appearing on each card.

9. The system of claim 5, wherein said card description database further comprises information on fields that can be personalized for each card.

10. The system of claim 5 wherein said database preparation computer system further comprises means for creating a menu database for querying the card printing system user for a plurality of special occasion parameters and linking cards to said special occasion parameters; wherein said menu database is copied on said removable storage media; and wherein the sequence of menus and the cards displayed for the user by said card printing system is controlled by said menu database.

11. The system of claim 5 wherein said printer reproduces color images by means of dots of a predetermined set of colors, and wherein said print images are stored in a dithered format in which said print images are reduced to patterns of said colors.

12. A system for printing social expression cards comprising:

a database preparation computer system having:
  (a) means for inputting graphic images for each of said cards;
  (b) means for creating a high-resolution print image file for each of said images;
  (c) means for creating a lower-resolution display image file for each of said images;
  (d) means for creating a card description database defining the layout of each card in terms of its component images and their locations on the card;
  (e) means for creating a card parameter database defining a series of card parameters associated with certain of said cards in said card description database; and
  (f) data storage means for storing said card description database, print image files, and display image files;

at least one card printing system having:
  (a) a display;
  (b) a printer;
  (c) input means;
  (d) data storage means for storing said card description database, print image files, and display image files;
  (e) processor means for using said card parameter database and said card description database to selectively retrieve display image files of cards from said data storage means and display said display images on said display; allowing a user to select a desired card via said input means; retrieving print image files for said selected card from said data storage means; and printing said print images on said printer; and means for transferring said card description database, print image files, and display image files from said database preparation computer system to said data storage means of said card printing system.

13. The system of claim 12 wherein said means for transferring said card description database, print image files, and display image files comprise removable data storage media.

14. The system of claim 12 wherein said means for transferring said card description database, print image files, and display image files comprise a CD-ROM.

15. The system of claim 12 wherein said card description database further comprises information defining any text appearing on each card.

16. The system of claim 12 wherein said card description database further comprises information on fields that can be personalized for each card.

17. The system of claim 12 wherein said database preparation computer system further comprises means for creating a menu database for querying the card printing system user for a plurality of special occasion parameters and linking cards to said special occasion parameters; wherein said menu database is transferred from said database preparation system to said data storage means of said card printing system; and wherein the sequence of menus and the cards displayed for the user by said card printing system is controlled by said menu database.

18. The system of claim 12 wherein said printer reproduces color images by means of dots of a predetermined set of colors, and wherein said print images are stored in a dithered format in which said print images are reduced to patterns of said colors.

* * * * *